United States Patent
Kim

(10) Patent No.: US 7,814,305 B2
(45) Date of Patent: Oct. 12, 2010

(54) APPARATUS AND METHOD FOR GENERATING RESET SIGNALS FOR FUNCTION CHIPS IN A TERMINAL

(75) Inventor: Dae-Hwan Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 560 days.

(21) Appl. No.: 11/868,099

(22) Filed: Oct. 5, 2007

(65) Prior Publication Data

US 2008/0091863 A1    Apr. 17, 2008

(30) Foreign Application Priority Data

Oct. 16, 2006    (KR) ................. 10-2006-0100541

(51) Int. Cl.
*G06F 1/24* (2006.01)
(52) U.S. Cl. ............................................. 713/1; 713/2
(58) Field of Classification Search .................... 713/1, 713/2
See application file for complete search history.

(56) References Cited

U.S. PATENT DOCUMENTS

| | | | | |
|---|---|---|---|---|
| 5,928,359 A | * | 7/1999 | Lee ................................ 713/1 |
| 6,085,342 A | * | 7/2000 | Marholev et al. ........... 714/724 |
| 6,148,397 A | * | 11/2000 | Chang ............................ 713/1 |
| 2004/0095171 A1 | * | 5/2004 | Kang ......................... 327/143 |

FOREIGN PATENT DOCUMENTS

KR    100248426    12/1999

* cited by examiner

*Primary Examiner*—Dennis M Butler
(74) *Attorney, Agent, or Firm*—The Farrell Law Firm, LLP

(57) ABSTRACT

Provided are an apparatus and method for generating reset signals in a portable terminal, in which function chips are provided. The apparatus includes a master chip, which resets the function chips using at least one address port selected from among address ports connected to a memory, and using a General Purpose Input Output (GPIO) port, and a reset unit, which generates reset signals for the function chips by combining output signals of the at least one address port and enables or disables the reset signals by a control signal received through the GPIO port.

9 Claims, 3 Drawing Sheets

APPARATUS AND METHOD FOR GENERATING RESET SIGNALS FOR FUNCTION CHIPS IN A TERMINAL

PRIORITY

This application claims priority under 35 U.S.C. §119(a) to a Korean Patent Application filed in the Korean Intellectual Property Office on Oct. 16, 2006 and assigned Serial No. 2006-100541, the entire disclosure of which is hereby incorporated by reference.

BACKGROUND OF THE INVENTION

1. Field of the Invention

The present invention generally relates to a portable terminal, and in particular, to an apparatus and method for generating reset signals for function chips in a portable terminal.

2. Description of the Related Art

Along with the recent deployment of various mobile communication services including broadcasting, multimedia video, e-mail, and multimedia messages, the potential of new emerging markets in the mobile communication industry is currently being tested. In this information era, users demand wireless multimedia services with a variety of Quality of Service (QoS) classes ranging from low-rate to high-rate services and from real-time to non-real-time services.

To meet the service demands, portable terminals are under development to support multiple functions. Accordingly, the portable terminals are provided with a plurality of additional function chips. These function chips are operated by power received from a battery under a control of a master chip.

The master chip supplies power to the function chips with their specific functions and controls the function chips to operate at reset timings requested for them, for their stable operations.

That is, the portable terminals are equipped with a plurality of function chips owing to the trend toward multiple functions. This implies that the master chip should generate additional control signals for controlling the function chips.

Conventionally, the master chip provides a reset signal to the function chips using dedicates ports designated for resetting the function chips or for using General Purpose Input Output (GPIO) ports as dedicated ports.

As a result, since the master chip provides the reset signals via a limited number of GPIO ports, there is a shortage of control ports for controlling the function chips corresponding to service functions added to the portable terminals.

FIG. 1 is a block diagram of a conventional reset signal generator.

Referring to FIG. 1, a power management Integrated Circuit (IC) 20 generates a reset indication signal "Reset_IN" a predetermined time after sensing power supplied from a battery 10 and provides the reset indication signal "Reset_IN" to a reset indicator 102.

Upon receiving the reset indication signal Reset_IN at the reset indicator 102, a master chip 100 generates reset signals for controlling a plurality of functions chips 130, 132, 134, and 136, used to achieve multiple functions, and provide the reset signals to the function chips 130, 132, 134, and 136 via dedicated ports. The function chips 130, 132, 134 and 136 include, for example, a Liquid Crystal Display (LCD) chip 130, a camera chip 132, a Bluetooth® (hereinafter, "Bluetooth") chip 134, and an application chip 136. The master chip 100 uses at least four GPIO ports 112, 114, 116, and 118 as dedicated ports, which are matched to the function chips 130 to 136 in a one-to-one correspondence.

Thus, the master chip 100 provides a reset signal to the LCD chip 130 via the GPIO port 112 (GPIO X1). The GPIO port 114 (GPIO X2) is used as a dedicated port through which a reset signal is provided to activate the camera chip 132. The GPIO port 116 (GPIO X3) is used as a dedicated port through which a reset signal is provided to the Bluetooth chip 134. The GPIO port 118 (GPIO X4) is used as a dedicated port through which a reset signal is provided to the application chip 136.

The master chip 100 also provides a control signal to a memory 150 that stores data for operating the function chips 130, 132, 134, and 136. The master chip 100 includes at least 25 address ports 120 to 128 through which to transmit particular addresses to the memory 150, and data ports (not shown) through which data is allocated to be written/read at the addresses.

Conventionally, as described above, the GPIO ports 112, 114, 116, and 118 are used as dedicated ports for providing the reset signals to the functions chips 130, 132, 134, and 136.

Although the GPIO ports are versatile in their usage according to their operation programs, use of the GPIO ports is limited as dedicated reset ports for providing reset signals.

Moreover, when other function chips are additionally provided to the portable terminal to realize multiple functions, the master chip 100, having the limited number of GPIO ports 112, 114, 116, and 118, cannot generate and provide reset signals for the additional function chips. In other words, the master chip 100 generates and provides the reset signals only for the function chips 130, 132, 134, and 136 connected to the limited number of GPIO ports 112, 114, 116, and 118.

Accordingly, more dedicated ports are needed to provide reset signals to the added function chips in the conventional portable communication system requiring additional functions. However, the allocation of versatile GPIO ports for transferring reset signals that are not frequent, and the allocation is not preferable in implementing a communication system.

Accordingly, there exists a need for a technique for efficiently utilizing ports through which to provide reset signals and a technique for efficiently providing a control signal in relation to the transfer of the reset signals in a portable terminal.

SUMMARY OF THE INVENTION

An aspect of the present invention is to substantially solve at least the above problems and/or disadvantages and to provide at least the advantages described below. Accordingly, one aspect of the present invention is to provide an apparatus and method for efficiently using a limited number of General Purpose Input Output (GPIO) ports in a portable terminal.

Another aspect of the present invention is to provide an apparatus and method for generating and providing reset signals in a portable terminal.

A further aspect of the present invention is to provide an apparatus and method for using at least one selected address port as a reset signal transmission port for a particular function chip in a portable terminal.

According to an aspect of the present invention, there is provided an apparatus for generating reset signals in a portable terminal, which includes function chips, a master chip resets the function chips using at least one address port selected from among address ports connected to a memory, and using a GPIO port, and a reset unit generates reset signals for the function chips by combining output signals of the at least one address port and enables or disables the reset signals by a control signal received through the GPIO port.

According to another aspect of the present invention, there is provided a method for generating reset signals in a portable terminal including function chips, which includes selecting at least one address port from among address ports connected to a memory according to the number of the function chips, and generating the reset signals for the function chips by combining output signals of the selected at least one address port and enabled or disabled by a control signal output from a GPIO port.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an apparatus and method for generating and providing reset signals for a plurality of function chips in a portable terminal. Particularly, the exemplary embodiments of the present invention provide an apparatus and method for utilizing part of address ports configured for managing a memory in transmitting reset signals to control function chips.

To maximize the utilization of a limited number of GPIO ports that are conventionally used for function chips in a one-to-one correspondence, therefore, the GPIO ports are variably used for various functions, taking into account the priority levels of the functions in conjunction with software programs according to an actual software design in the present invention. That is, as the GPIO ports are used to support particular situations, their utilization is increased.

The GPIO ports were defined to facilitate building a development environment and providing a system structure optimal for a programming language, as download software for compliers and programs of an 8-bit Micro Controller Unit (MCU) is provided for free.

Hence, a master chip in a portable terminal selects at least one address port available for transmitting a reset signal and transmits the reset signal through the selected address port. Consequently, GPIO ports that facilitate software implementation are used to support multi-functional services as well as to transmit reset signals.

Figure 1:
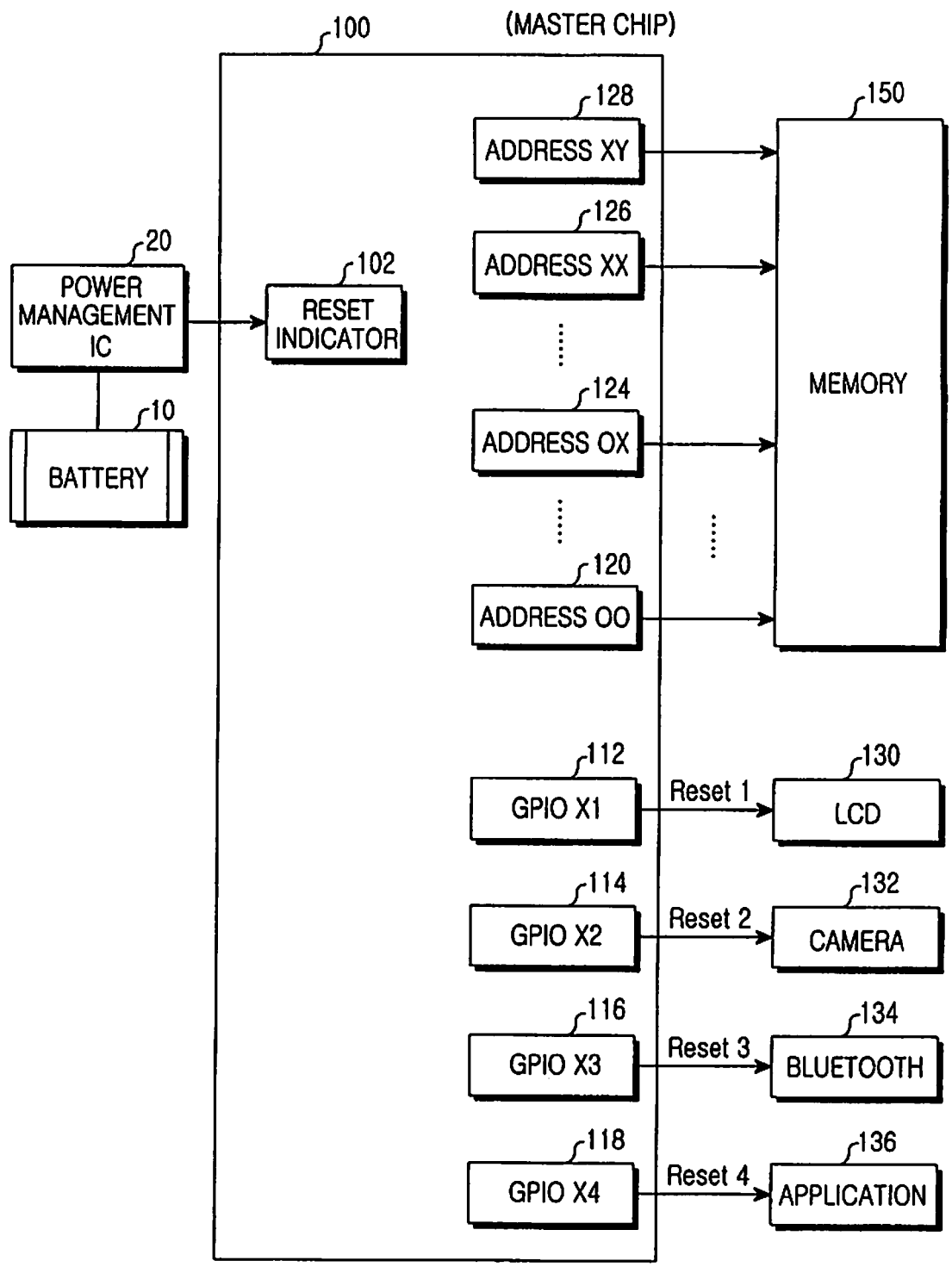
FIG. 1 is a block diagram of a conventional reset signal generator.
Figure 2:
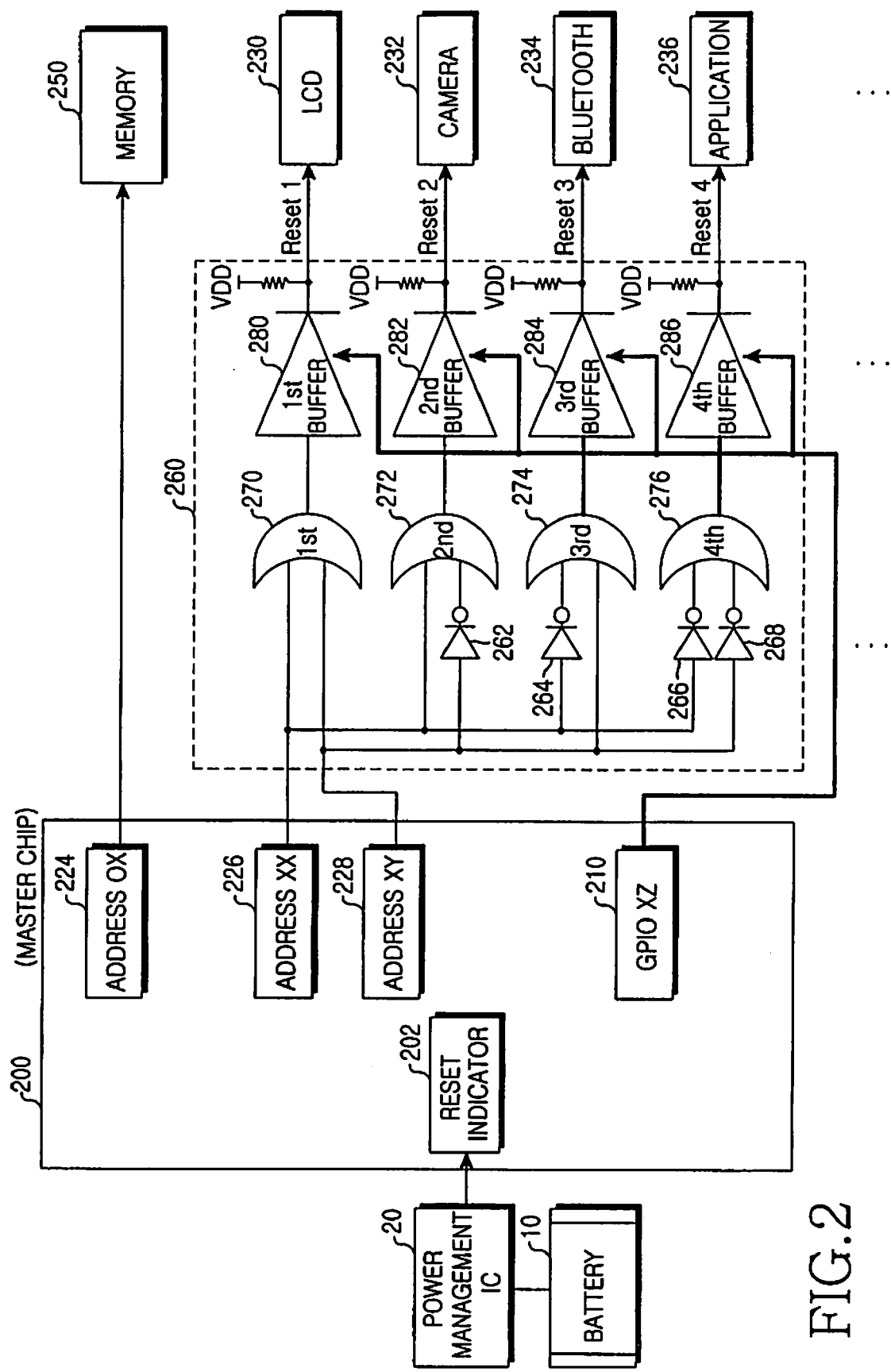
FIG. 2 is a block diagram of a reset signal generator according to an exemplary embodiment of the present invention.

FIG. 2 is a block diagram of a reset signal generator according to an exemplary embodiment of the present invention.

In FIG. 2, a master chip 200 selects, as ports for generating reset signals, upper address ports or relatively less frequently used address ports 226 and 228 from among address ports 224 to 228 connected to a memory 250, for managing allocation of an address/addresses of the memory 250. The address ports 226 and 228 are connected to the memory 250 and a reset unit 260.

The power management Integrated Circuit (IC) 20 generates a reset indication signal "Reset_IN" a predetermined time after sensing a supply of power from the battery 10 and provides the reset indication signal "Reset_IN" to a reset indicator 202 in the master chip 200.

Upon receiving the reset indication signal "Reset_IN" the master chip 200 performs chip resetting by providing a reset signal to a function chip associated with an operation of the portable terminal.

A brief description of the chip resetting is made below.

Upon powering-on the portable terminal, a function chip is reset, such as an LCD chip 230, a camera chip 232, a Bluetooth chip 234 for supporting a short range communication with other communication terminals within a preset range, or at least one application chip 236 for supporting digital multimedia service. The at least one application chip 236 can be a Digital Multimedia Broadcasting (DMB) chip for a digital broadcasting service, a Wireless Broadband (WiBro) chip for portable Internet service, etc.

In accordance with the present invention, the master chip 200 uses the relatively less frequently used address ports 226 and 228 as reset signal transmission ports for controlling particular function chips during resetting. The master chip 200 determines a number of address ports for providing reset signals according to a number of function chips provided in the portable terminal.

For example, if four or less function chips exist in the portable terminal, the master chip 200 selects at least two address ports and transmits reset signals through the at least two address ports. If the number of the function chips is greater than 4 and less than or equal to 8, the master chip 200 selects at least three address ports and transmits reset signals through the at least three address ports. The number of the selected address ports varies with the number of added function chips.

Thus, the master chip 200 performs resetting only in a resetting period using the address ports 226 and 228 selected according to the number of the function chips. The master chip 200 also designates one GPIO port 210 to indicate enable/disable of all reset signals. The reset unit 260 for transmitting the reset signals to the function chips 230 to 236 includes inverters 262 to 268, OR gates 270 to 276, and buffers 280 to 286. The inverters 262 to 268 and the OR gates 270 to 276 transmit the reset signals for the function chips 230 to 236 separately, and the buffers 280 to 286 store the reset signals.

Table 1 illustrates four reset signals generated by using the two address ports 226 and 228 in the master chip 200. For combinations of the power levels of the two address ports 226 and 228, the reset unit 260 generates the four reset signals using the inverters 262 to 268 and the OR gates 270 to 276.

TABLE 1

| Ax:Ay | Reset 1 | Reset 2 | Reset 3 | Reset 4 |
|---|---|---|---|---|
| 0:0 | 0 | 1 | 1 | 1 |
| 0:1 | 1 | 0 | 1 | 1 |
| 1:0 | 1 | 1 | 0 | 1 |
| 1:1 | 1 | 1 | 1 | 0 |

The GPIO port 210 applies an Enable signal to the buffers 280 to 286 of the reset unit 260. That is, the master chip 200 can control enable/disable of the reset signals for the added function chips by a control signal provided through the single GPIO port 210.

To be more specific, the master chip 200 writes or reads data on or from the memory 250 by continually using the selected address ports 226 and 228 as the system operates. Since a change in the power levels of the address ports 226 and 228 affects reset signals stored in the buffers 280 to 286 during resetting, the buffers 280 to 286 are controlled by the GPIO port 210 while the memory 250 is used.

Since each function chip is reset to active low, pull-up resistors are connected outside or inside the buffers 280 to 286 to stably maintain the reset signals at a high level in time periods other than a reset period. Chip resetting is equivalent to keeping a reset signal at a low level for a necessary time period. When the reset is completed, the reset signal should be kept at the high level, for stable operation.

That is, the GPIO port 210 is kept low to keep the buffers 280 to 286 inactive during resetting, so as to keep the reset signals high by the pull-up resistors.

To generate reset signals, the inverters 270 to 276 and the OR gates 280 to 286 connected to the function chips 230 to 236 to be reset are checked by changing the power levels of the address ports 226 and 228. Then, the GPIO port 210 enables the buffers 280 to 286 in order to change the function chips 230 to 236 to a low level. Thus, the function chips 230 to 236 are reset. When the buffers 280 to 286 are disabled by the GPIO port 210 according to a reset timing, the function chips 230 to 236 are kept high.

Figure 3:
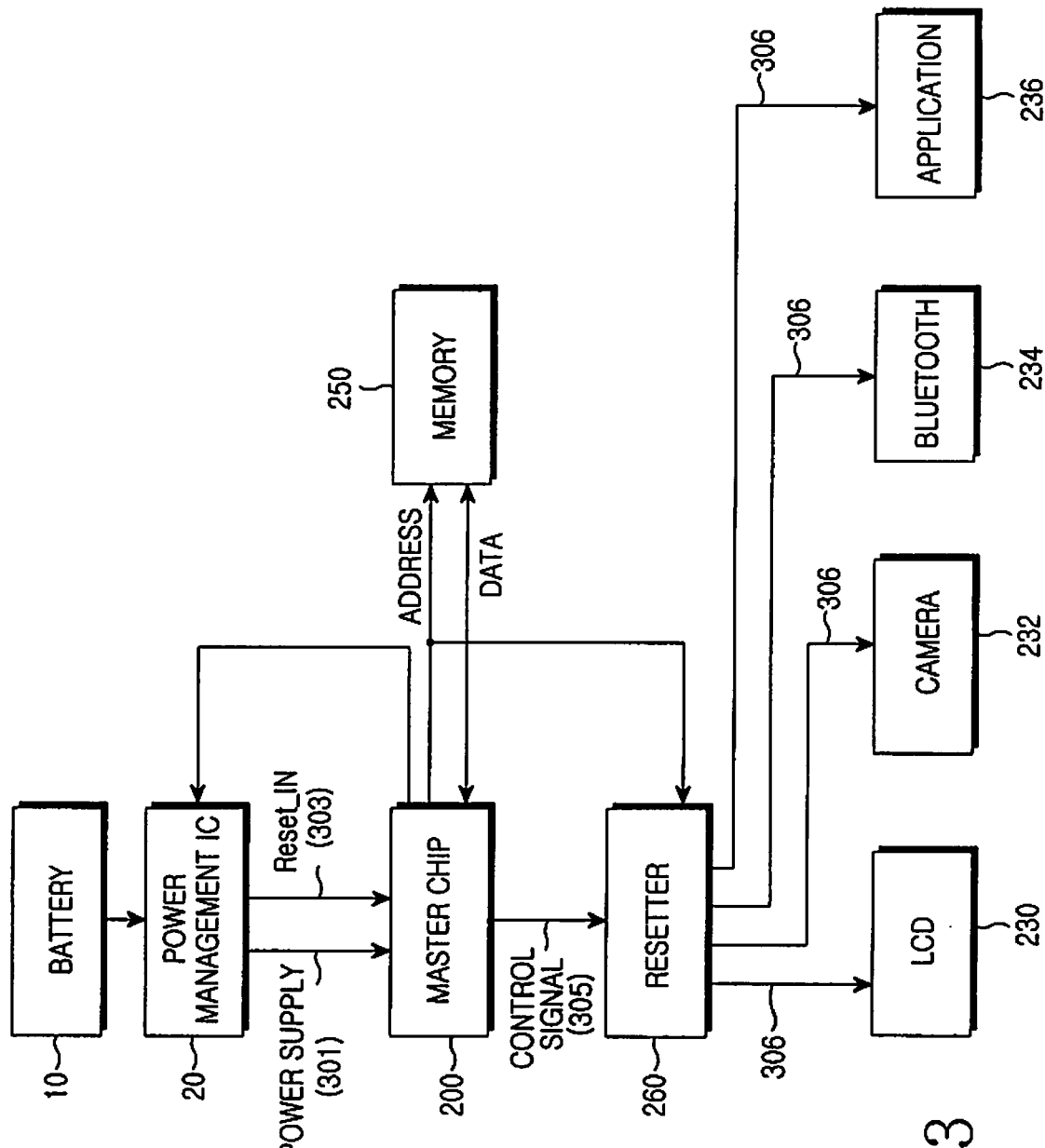
FIG. 3 illustrates a control signal flow for generating and providing reset signals according to an exemplary embodiment of the present invention.

FIG. 3 illustrates a method for generating the reset signals illustrated in FIG. 2.

In FIG. 3, the master chip 200 detects a reset indication signal 303 by sensing a power supply 301 supplied from the battery 10. To reset particular function chips 230 to 236, the master chip 200 monitors the statuses of the address ports 224 to 228 connected to the memory 250 for data reading or writing, and selects less frequently used address ports 226 and 228 or address ports 226 and 228 corresponding to upper two bits from among the address ports 224 to 228, for generating reset signals for the function chips 230 to 236.

Upon receiving a control signal 305 from the master chip 200, the reset unit 260 sets the selected address ports 226 and 228 high by applying power to the selected address ports 226 and 228, and generates four reset signals 306 corresponding to the function chips 230 to 236 using the four inverters 262 to 268 and the four OR gates 270 to 276 with respect to the address ports 226 and 228 at the high level.

The master chip 200 sets the single GPIO port 210 high, thereby enabling the buffers 280 to 286 corresponding to the function chips 230 to 236. Hence, the intended function chips 230 to 236 operate at the low level.

That is, the master chip 200 applies power to the intended function chips 230 to 236, and provides a control signal for operating the function chips 230 to 236 at the low level by combining the power levels of the address ports 226 and 228. After a reset time period, the buffers 280 to 286 are disabled. As the reset unit 260 is high at its output ports, the resetting of the function chips 230 and 236 is completed.

As is apparent from the above description, the present invention solves the problem of a shortage of GPIO ports in a master chip, encountered with the trend of towards multifunctional portable terminals. Using a control signal configured for a multifunctional portable terminal, i.e. using address ports in place of insufficient GPIO ports helps execute the multiple functions of the portable terminal. As a reset signal is provided to each chip using address ports, a lack of control signals in the master chip is overcome and GPIO ports can be used for other purposes.

Also, since reset signals are enabled using a single GPIO port, multiple function chips can be controlled using the GPIO port. That is, as a reset signal is separately provided to each function chip, an unstable chip can reset at a power supply, and a resulting in malfunction is prevented.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for generating reset signals in a portable terminal, comprising:
   a plurality of function chips;
   a master chip for resetting the plurality of function chips using at least one address port selected from among address ports connected to a memory, and using a General Purpose Input Output (GPIO) port; and
   a reset unit for generating reset signals for the plurality of function chips by combining output signals of the at least one address port and enabling or disabling the reset signals by a control signal received through the GPIO port.

2. The apparatus of claim 1, wherein the at least one address port comprises a plurality of a relatively less frequently used upper address ports, wherein a number of the relatively less frequently used upper address ports is equal to a number of the plurality of function chips.

3. The apparatus of claim 1, wherein the reset unit comprises:
   logic gates for generating a reset signal for at least one of the function chips by combining the output signals of the at least one address port; and
   buffers for storing the at least one reset signal, and when being enabled by the control signal from the GPIO port, providing the stored at least one reset signal to the plurality of function chips.

4. The apparatus of claim 3, wherein the reset unit generates the reset signals using the logic gates, a number of the logic gates being equal to a number of the function chips.

5. The apparatus of claim 3, wherein the reset unit further comprises pull-up resistors connected to output ends of the buffers to maintain outputs of the buffers at a high level until the reset signals are enabled by the control signal.

6. The apparatus of claim 1, wherein the reset unit comprises:
   a first logic gate for combining a first output signal and a second output signal from two selected address ports;
   a second logic gate for combining the first output signal with an inverted signal of the second output signal;
   a third logic gate for combining an inverted signal of the first output signal with the second output signal;
   a fourth logic gate for combining the inverted signal of the first output signal with the inverted signal of the second output signal;
   first to fourth buffers connected to output ends of the first to fourth logic gates; and
   first to fourth pull-up resistors connected to output ends of the first to fourth buffers.

7. The apparatus of claim 1, wherein the master chip sets the GPIO port to a high level by applying power to the GPIO port so as to enable the reset signals by the control signal output from the GPIO port.

8. A method for generating reset signals in a portable terminal including plurality of function chips, comprising:
   selecting at least one address port according to a number of the plurality of function chips from among address ports connected to a memory; and
   generating the reset signals for the plurality of function chips by combining output signals of the selected at least one address port and enabling or disabling the reset signals by a control signal output from a General Purpose Input Output (GPIO) port.

9. The method of claim 8, wherein the at least one address port is a plurality of a relatively less frequently used upper address ports, wherein a number of the relatively less frequently used upper address ports is equal to a number of the plurality of function chips.

* * * * *